Aug. 21, 1956 WEN YUAN PAN ET AL 2,760,061
SIGNAL CONVERTER CIRCUIT
Filed Nov. 22, 1952
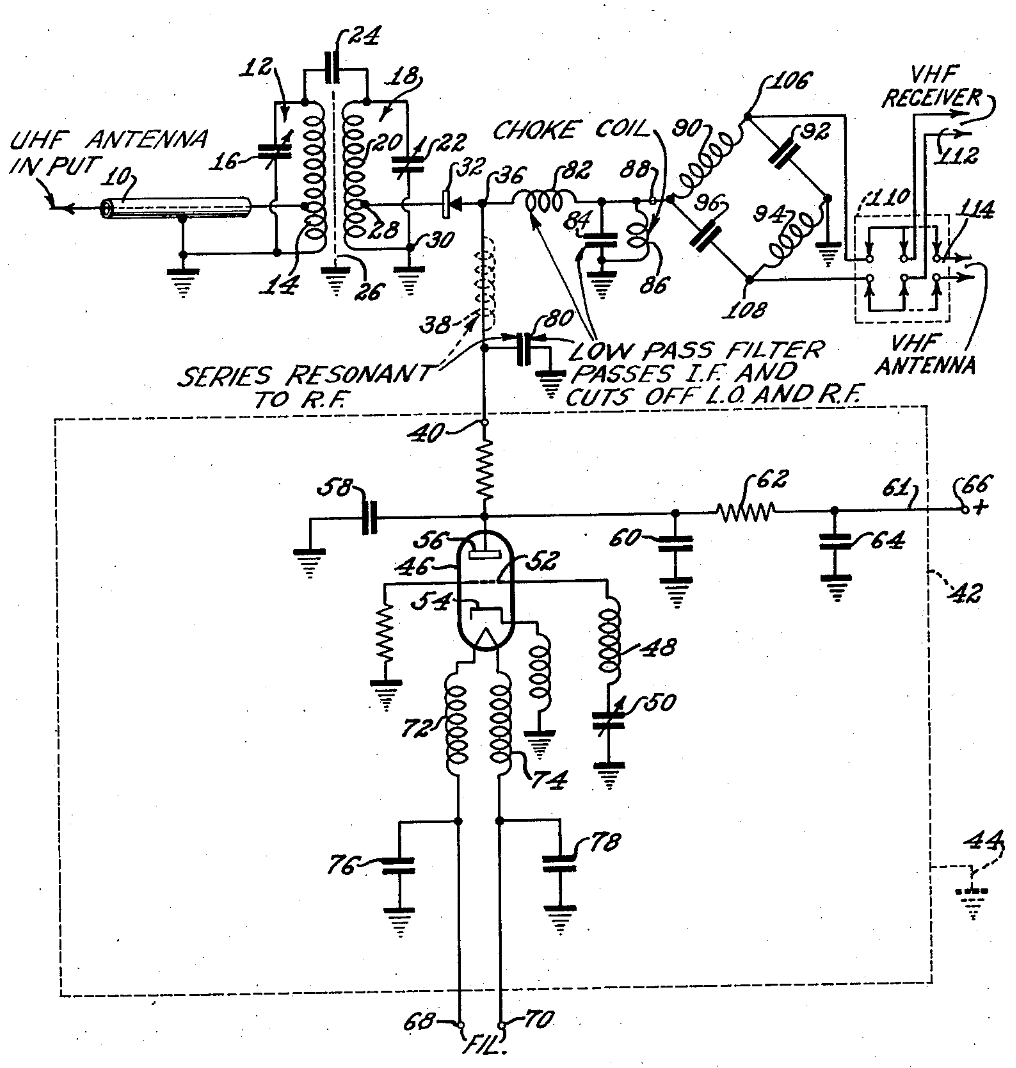
INVENTOR.
WEN YUAN PAN &
HAROLD M. WASSON
BY H. D. Newton
ATTORNEY United States Patent Office 2,760,061

Patented Aug. 21, 1956

2,760,061

SIGNAL CONVERTER CIRCUIT

Wen Yuan Pan, Collingswood, and Harold M. Wasson, Woodbury, N. J., assignors to Radio Corporation of America, a corporation of Delaware Application November 22, 1952, Serial No. 322,084

4 Claims. (Cl. 250—20)

The present invention relates to improvements in radio signal receiving apparatus and more particularly, although not necessarily exclusively, to radio signal frequency converting arrangements in which radio signals occupying one frequency band are selectively heterodyned to occupy positions in another frequency band.

More directly, the present invention relates to improvements in the design of radio signal converting mechanisms useful in the conversion of ultrahigh frequency (U. H. F.) signals to very high frequency (V. H. F.) signals whereby to extend the utility of radio signal receiving apparatus designed to receive only signals falling in the very high frequency (V. H. F.) band.

As a result of recent Government allocation of television broadcast channels in the ultrahigh frequency radio spectrum, considerable engineering effort has been extended throughout the radio field to devise inexpensive frequency conversion equipment which will permit existing radio receivers adapted to receive V. H. F. television signals to successfully receive elected channels in the newly assigned ultrahigh frequency (U. H. F.) band. In order for the public to receive maximum benefit from the ultrahigh frequency (U. H. F.) television allocation, it is essential that the frequency conversion equipment offered to the public not only be inexpensive, thereby assuring widespread purchasing of conversion equipment for utilization of the allocated U. H. F. band, but the conversion equipment must be stable and reliable in operation.

The basic technique of signal conversion in which signals lying in one frequency band are through heterodyne action caused to occupy a position in another frequency band is well known in the art. Many circuit arrangements have been described in the prior art for use in radio frequency conversion. These equipments have ranged from types employing complex circuitry and construction of relatively high cost to simple arrangements which because of low cost must tolerate certain compromises in optimum engineering design.

Numerous problems arise in the design of frequency conversion equipment as its designated operating frequencies are extended to the ultrahigh frequency range. One of the most popular techniques suitable for U. H. F. to V. H. F. signal conversion, involves the application of the U. H. F. signal to the input of a non-linear signal mixing circuit in which a beat or heterodyne signal is developed. The heterodyne signal or beat results from the non-linear combination, i. e., the vectorial multiplication, of the U. H. F. signal with a locally generated mixer signal established in the U. H. F. range and differing in frequency from the received U. H. F. signal by an amount equal to the frequency of the V. H. F. channel to which the incoming signal is to be converted.

As a signal converter operating frequency is increased to fall into the U. H. F. band care must be taken to insure that the operating conditions of the non-linear circuit is optimum in order that an acceptable degree of signal conversion efficiency or gain is realized. Moreover, since the output signal of the U. H. F. to V. H. F. television signal converter is to be connected with the input circuit of a V. H. F. superheterodyne receiver, the problem of converter local oscillator radiation arises as well as the problem of interaction between the converter local oscillator and the local oscillator in the superheterodyne V. H. F. receiver. Heretofore, unless very elaborate precautions were taken, local oscillator energy corresponding to converter local oscillator operation would be radiated from the leads connecting the output circuit of the converter to the input of the V. H. F. television receiver. Also harmonics developed by the V. H. F. receiver local oscillator would find their way back to the converter mixer circuit and produce spurious "beat" responses.

In general, it may be said, that where the non-linear signal mixing means is of the crystal variety, it is extremely important that the impedance of the load circuit into which the crystal mixer is operating is negligibly low (as close to zero as practicable). Furthermore, the crystal mixer load circuit should present a nominal impedance closely equal to the internal impedance of the crystal element at the frequency of the heterodyne or resultant V. H. F. signal produced by the non-linear mixer action. Moreover, diode crystal mixing elements lend themselves most readily to single ended circuit operations. Therefore means should be provided for transforming, in an economical fashion, the single ended output system of a diode mixer circuit to a double ended or balanced type of output system which finds ready application to the balanced transmission line input systems of commercially available V. H. F. television receivers.

The present invention provides a signal conversion circuit arrangement which meets all of the above requirements and overcomes all of the above-mentioned problems in an economical yet stable and reliable fashion.

It is, therefore, an object of the present invention to provide a signal frequency conversion circuit in which is realized a high signal conversion efficiency.

It is further an object of the present invention to provide an improved signal conversion arrangement in which the output circuit thereof is substantially isolated from the non-linear mixer element therein at all frequencies except the heterodyne or output signal developed by the mixer element.

It is further an object of the present invention to provide a novel and improved signal frequency conversion system employing a single crystal type mixer element yet providing a balanced type of output circuit for ready connection with signal receiving circuits having balanced input terminals.

It is also an object of the present invention to provide a novel load circuit configuration for non-linear signal combining means of the type used in signal frequency conversion systems such that high conversion efficiency is realized attendant with maximum suppression in the output circuit of signal frequencies corresponding to the signal to be converted as well as the local oscillator conversion frequency.

In the realization of the above objects and features of advantage, in the practice of the present invention, in one of its many forms employs a non-linear mixer element, which may be of the crystal variety, whose load circuit includes a modified constant K-type pi section low-press filter. The input arm of the pi type filter is, in accordance with the present invention, made series resonant at the signal frequency to be converted thereby to impose a very low impedance load to the non-linear mixer element. The local oscillator signal or conversion signal to be combined with the signal to be converted, is in accordance with the present invention, applied to the mixer element through a portion of the series resonant arm of the pi filter. The cutoff frequency of the low-pass filter is then made substantially lower in frequency than either the signal to be converted or the local oscillator, yet above the desired resultant beat or heterodyne signal.

The present invention further involves the connection of the pi filter output terminals with a lattice network having moderate Q resonant arms tuned to the desired beat or heterodyne frequency. The single ended output of the pi filter is then connected across one set of arms of the lattice network whereby to provide in the remaining two arms of the lattice network balanced circuit terminals suitable for connecting to balanced transmission lines.

A more complete understanding of the present invention as well as a better appreciation of its objects and features of advantage in addition to those set forth above will be obtained through a reading of the following specification, especially when taken in connection with the accompanying drawing in which the single figure is a schematic representation of one form of converter circuit embodying the present invention.

Turning now to the single figure, there is shown at 10 a transmission line adapted to feed ultrahigh frequency (U. H. F.) carrier waves to a tunable radio frequency (R. F.) signal selector circuit 12 which includes an inductor 14 and a capacitor 16. A similar tunable R. F. signal selector circuit 18 including an inductor 20 and capacitor 22 is coupled to the selective circuit 12 by means of mutual inductance existing between the inductors 14 and 20.

The selective circuits 12 and 18 are further coupled together by means of the coupling capacitor 24. An electrostatic shield indicated by the dotted line 26 is disposed between the inductors 14 and 20 so that the only significant capacitive coupling between the two circuits is provided by the capacitor 24. Selected incoming U. H. F. signal will, therefore, appear between the low impedance tap 28 on inductor 20 and the circuit ground potential terminal at 30.

A non-linear signal mixing or combining means is illustrated and connected with the tap 28 of the selective circuit 18. By way of example, this mixing circuit has been shown as including a diode 32 one of whose terminals is connected to the low impedance tap 28 on the inductor 20. The other terminal 36 of the diode 32 is connected through an inductive lead 38 to the output terminal 40 of some form of oscillator circuit 42. The dotted line area 42 may also indicate a metallic shield for the oscillator components within the area. Grounding of the shield 44 improves the effectiveness of the shield in reducing undesired radiation of oscillator energy. The connective lead 38 extending between the diode terminal 36 and the oscillator output terminal 40 may, in the practice of the present invention, be nothing more than a straight piece of wire. However, the dotted line inductance designation surrounding the lead 38 is presented to indicate that the inductance of this lead plays an important part in the practice of the present invention.

The type of oscillator circuit employed in the practice of the present invention is not important. The one shown in the single figure being merely illustrative of one type of oscillator circuit finding convenient application to the particular mixer circuit shown. By way of example, the oscillator 42 is shown comprising an electron discharge tube 46 connected in a modified Colpits oscillator circuit. A series tuned circuit comprising the inductor 48 and capacitance 50 is connected between the control electrode 52 and circuit ground for determining the operating frequency of the oscillator. The well known split capacitances of a Colpits oscillator are defined between the control electrodes 52 and the cathode 54 as well as between the anode 56 and cathode 54. Capacitors 58 and 60 maintain the anode 56 at a very low impedance level with respect to chassis ground thereby tending to reduce oscillator radiation through the power supply line 61. Filter elements 62 and 64 further attenuate oscillator radiation via the "B" power supply system. "B" power for the operation of the oscillator may be applied to terminal 66 while heater potential for the electron tube 46 is applied to terminal 68 and 70. Chokes 72 and 74 acting in cooperation with capacitors 76 and 78 attenuate radiation of oscillator energy over the heater supply lines. Novel features and advantages of the particular form of oscillator shown are disclosed and claimed in the copending United States Patent application, Serial No. 321,668, filed November 20, 1952, Patent No. 2,728,853 granted December 27, 1955, entitled "Oscillator Circuits" by Wen Yuan Pan and H. M. Wasson.

In accordance with the present invention, a capacitor 80 is connected from the oscillator output terminal 40 to ground potential. The value of the capacitor 80 is such that it forms a series resonant circuit in conjunction with the inductance of lead 38 at approximately the mid range of those frequencies over which the selective circuits 12 and 18 can be tuned. By way of example, in the application of the present invention to ultrahigh frequency television band conversion, the series resonant frequency of lead 38 and capacitor 80 may be established at 700 mc. This series resonance assures that the load impedance into which the diode 32 is operating is at a minimum at this frequency. As discussed above conversion efficiency of a crystal diode employed as shown in the figure is greatly enhanced if the load impedance at the frequency being converted is at a minimum.

In further accordance with the present invention, the capacitor 80 forms the input capacitor of a modified constant-K p-type low-pass filter including inductor 82 and capacitor 84. The choke 86 forms the necessary D.-C. path for the diode mixer element 32. The low-pass filter comprising elements 80, 82 and 84 is, in accordance with the present invention, provided with a cutoff frequency which is below the operating frequency of the oscillator frequency 42 or any frequency passed by the selective circuits 12 and 18.

In accordance with the present invention, the characteristic impedance of the low-pass filter circuit is assigned a value approximating the operating impedance of the diode element 32 in the frequency range at which it is operating.

In the application of the present invention in U. H. F. to V. H. F. television signal conversion systems, the low-pass filter may be conveniently assigned a cutoff frequency of 140 mc. It will be recognized that this will permit the V. H. F. televisions channels 2 through 6 (54 mc. to 82 mc.) to be employed as output signal frequencies for the converter circuit. The particular channel 2 through 6 that is selected for use will, of course, depend upon the frequency of the oscillator 42 which, of course, is determined by adjusting the capacitor 50 thereof.

It is further a novel feature of the present invention that the inductance of the lead 38, although playing an important role in establishing a low impedance series resonant circuit load for the diode 32 at the mid range of frequencies passed by the selective input circuits, also provides negligible impedance at the frequency to which input signals are being converted. Thus, at 140 mc. or below, the inductance of the lead 38 will have virtually no effect on the characteristics of the low-pass filter.

The present invention thus far described results in a signal converter circuit having a single ended output whose output terminal may be thought of as established at terminal 88. The low-pass filter will not only prevent converter local oscillator signals from passing through to the output terminal 88, but will also prevent harmonics of the V. H. F. television receiver to which terminal 88 may be connected from producing spurious heterodyne components in the mixer circuit.

If the receiver with which the converter circuit thus far described is to be used has a single ended or unbalanced type of input circuit a coaxial cable or other suitable signal conveying means may be connected between the terminal 88 and ground potential for conveying the output of the converter to the receiver. If, however, the converter circuit thus far described is to be used in connection with commercial home type V. H. F. television equipments, the majority of which are provided with balanced types of input circuits, some convenient means must be employed for converting the single ended converter output circuit defined by terminal 88 (and chassis ground) to a balanced output arrangement.

In accordance with the present invention, a novel unvalanced to balanced transformation arrangement is provided by the inductor 90, capacitor 92, inductor 94 and capacitor 96 connected in a lattice or bridge formation.

In accordance with the present invention, the values of the inductors 90 and 94 and capacitors 92 and 96 are chosen such that the $\sqrt{X_L X_C}$ is equal to the nominal impedance of the low-pass filter previously described. Here $X_L$ is the inductive reactance and $X_C$ is the capacitance reactance of elements comprising the lattice at the center frequency of the desired pass-band of the lattice network. In the application of the present invention in U. H. F. to V. H. F. television signal conversion, it is convenient to design the lattice network to meet the above conditions at a center frequency of approximately 72 mc. This corresponds to the Government allocated V. H. F. television channel 4. By connecting the output terminal 88 of the converter circuit to the junction of inductor 90 and capacitor 96 and by grounding the junction of inductor 94 with capacitor 92, a balanced transmission line may be connected to the terminals 106 and 108 of the lattice network. The switch also conditionally connects the V. H. F. receiver to either a V. H. F. antenna applied to the terminals 114 of the switch or the balanced output terminals of the lattice network.

In the application of the present invention to a signal conversion unit for use in converting U. H. F. television channels to signals falling in the lower V. H. F. television channels 2 through 6, it is further contemplated in accordance with the present invention that the non-linear mixing element 32 will be selected so as to display nominal impedance of approximately 300 ohms. Such a mixer element is found in the commercially available CK–710 crystal rectifier which displays an impedance of approximately 300 ohms under optimum oscillator excitation. This permits the low-pass filter comprising elements 80, 82 and 84 to be designed around a nominal impedance of 300 ohms and with a cutoff frequency of 140 mc. or so. The lattice network comprising elements 90, 92, 94 and 96 may then be designed as indicated above to express a terminal impedance of approximately 300 ohms in the V. H. F. channel 4 frequency (66 mc. to 72 mc.). Under such conditions the balanced output terminal impedance expressed at terminals 106 and 108 will be 300 ohms and will provide a proper impedance match to a standard 300 ohm balanced transmission line, such as is found in common home television use. With such an arrangement it has been found that a standing wave ratio of 1 for channel 4 will be realized, a standing wave ratio of 1.5 for channels 3 and 5, and a standing wave ratio of 2 for channels 2 and 6.

It can therefore be seen that in accordance with the present invention there may be provided a novel, inexpensive and highly efficient signal frequency converting systm of general application in the signal communications art and finding particular utility in connection with television U. H. F. to V. H. F. signal conversion.

What is claimed is:

1. In an electrical signal conversion system, the combination of: a primary input signal terminal referenced to ground designated to receive signals whose frequencies are to be converted to lower frequencies, a mixing signal input terminal designated to receive a mixing signal whose frequency differs from said primary input terminal signals by an amount equal to the extent that said primary signals are to be lowered, an output terminal designated to deliver converted primary signals, a low-pass filter connected from said mixing signal input terminal to said output terminal, said low pass filter including an electrical conductor and capacitance connected in series between said mixing signal input terminal and ground, said conductor having an inductance value which when taken in combination with said capacitance forms a series resonant circuit having a resonant frequency in the range of signals applied to said input signal terminal, and a non-linear unilaterally conducting circuit element connected from said input terminal to said low-pass filter.

2. In a signal frequency conversion system, the combination of: a primary input terminal referenced to ground designated to receive primary signals whose frequencies are to be converted to lower frequencies through heterodyne action, means providing a source of heterodyne mixing signals for non-linear combination with said primary signals to produce a beat frequency having a value lower in frequency than said primary signals or said mixing signal; an output terminal to which is to be delivered the desired heterodyne beat signal, a crystal diode connected to said primary input terminal, a low-pass filter connected between said crystal diode and said output terminal, said low pass filter including an electrical conductor and capacitance connected in series between said crystal diode and ground, said conductor having an inductance value which has negligible impedance to said beat frequency but when taken in combination with said capacitance forms a series resonant circuit having a resonant frequency in the range of signals applied to said primary input terminal, means for connecting said source of heterodyne mixing signals to said crystal diode through said electrical conductor.

3. In an ultrahigh frequency television converter having a pair of input terminals the combination comprising resonant circuit means coupled to said input terminals for selecting a predetermined ultrahigh frequency carrier wave, means including a source of ultrahigh frequency mixer waves and a crystal mixer connected to said resonant circuit means for converting said carrier wave to an intermediate frequency wave having a frequency lying with the very high television frequency band, an output circuit, and a low pass filter section having an input impedance which is connected between said crystal mixer, and said output circuit, the input impedance of said filter network being selected to match the intermediate frequency internal impedance of said crystal mixer, said filter network including a series inductance capacitance circuit resonant in the range of signal frequencies to be received, the impedance of said inductance being negligible at said intermediate frequency.

4. In a signal frequency conversion system, the combination of, a primary input terminal referenced to ground designated to receive primary signals the frequency of which are to be converted to lower frequencies through a heterodyne action, an output terminal to which is to be delivered the desired heterodyne beat signal, a crystal diode connected to said input terminal, a low pass filter connected between said crystal diode and said output terminal, means providing a source of heterodyne mixing signal for non-linear combination with said primary signals to produce a beat frequency having a value lower in frequency than said primary signals or said mixing signals, means providing an inductance element connecting said source of heterodyne mixing signals to said crystal diode, said low pass filter including said inductance element and a capacitance connected in series between said crystal diode and ground, said inductance element having an inductance which is of negligible impedance at said beat frequency and which when taken in combination with said capacitance forms a series resonant circuit having a resonant frequency in the range of signals applied to said signal input terminal, and a lattice type network having a first and second series resonant arms connected with each other to form a bridge configuration having two sets of oppositely positioned terminals, coupling means from said output terminal to one of said lattice terminals, connections from the opposite terminal on said lattice to said point of signal reference, said remaining lattice terminals being designated as balanced circuit output terminals.

References Cited in the file of this patent

UNITED STATES PATENTS

| | | |
|---|---|---|
| 1,888,430 | Miller | Nov. 22, 1932 |
| 1,907,624 | Villem et al. | May 9, 1933 |
| 1,987,984 | Barden | Jan. 15, 1935 |
| 2,011,941 | Snider | Aug. 20, 1935 |
| 2,041,433 | Scheppmann | May 19, 1936 |
| 2,484,028 | Hansen | Oct. 11, 1949 |
| 2,596,117 | Bell | May 13, 1952 |
| 2,640,919 | Bell | June 2, 1953 |